United States Patent
Mann et al.

(10) Patent No.: US 7,516,974 B1
(45) Date of Patent: Apr. 14, 2009

(54) FIFTH WHEEL ASSEMBLY

(75) Inventors: Steven William Mann, Gardendale, AL (US); Jeff Marcus Terry, Birmingham, AL (US); James Matthew Rhodes, Pelham, AL (US); Christopher Aaron Bond, Pinson, AL (US)

(73) Assignee: Fontaine International, Irondale, AL (US)

( * ) Notice: Subject to any disclaimer, the term of this patent is extended or adjusted under 35 U.S.C. 154(b) by 336 days.

(21) Appl. No.: 11/368,064

(22) Filed: Mar. 3, 2006

(51) Int. Cl.
*B62D 53/06* (2006.01)

(52) U.S. Cl. .................. 280/433; 280/407; 280/438.1; 280/441.1; 280/407.1

(58) Field of Classification Search .............. 280/433, 280/407, 438.1, 441.1, 407.1
See application file for complete search history.

(56) References Cited

U.S. PATENT DOCUMENTS

| | | | |
|---|---|---|---|
| 2,402,254 A * | 6/1946 | Maddock et al. ............ 384/421 |
| 4,721,323 A | 1/1988 | Czuk et al. |
| 5,449,191 A * | 9/1995 | Cattau ...................... 280/438.1 |
| 5,707,070 A | 1/1998 | Lindenman et al. |
| 6,488,305 B2 * | 12/2002 | Laarman .................. 280/438.1 |
| 6,623,024 B1 * | 9/2003 | Alguera Gallego et al. . 280/433 |
| 6,726,179 B2 * | 4/2004 | Ketchapaw et al. ......... 280/441 |
| 7,198,282 B2 * | 4/2007 | Burchett ..................... 280/433 |

\* cited by examiner

*Primary Examiner*—Paul N Dickson
*Assistant Examiner*—Michael R Stabley
(74) *Attorney, Agent, or Firm*—George P. Kobler; Lanier Ford Shaver & Payne P.C.

(57) ABSTRACT

A fifth wheel assembly comprises a fifth wheel having a plurality of journal bearings extending generally downward from its underside, and a transverse beam member for mounting the assembly to a truck frame. The beam member is dimensioned to span across parallel longitudinal truck frame members and it includes mounting flanges extending generally downward from either lateral side where the mounting flanges have a plurality of apertures for receiving suitable fasteners inserted therein for mounting said beam member to the truck frame members. The transverse member also includes a plurality of pivot bearing pairs to receive the journal bearings of the fifth wheel which is coupled thereto by a trunnion.

6 Claims, 5 Drawing Sheets

FIFTH WHEEL ASSEMBLY

BACKGROUND

1. Field

The present invention relates generally to fifth wheel assemblies, and in particular, to fifth wheel assemblies with direct-mount transverse beams and compatibly configured fifth wheels.

2. Description of the Related Art

Fifth wheel hitches for towing a trailer behind a towing vehicle have long been known in the art. Examples of fifth wheel hitches include those disclosed in U.S. Pat. Nos. 4,721,323, 5,449,191, and 5,707,070.

With reference to FIGS. 1A and 1B, large over-the-road freight trailers 119 are usually coupled to tractor trucks 109 by means of a fifth wheel coupling 101 whereby the truck rear drive axles directly support a portion of the trailer 119 load burden. Usually, the fifth wheel coupling 101 and support point is located along the length of the tractor 109 between the rear drive wheels and the front steering wheels thereby distributing the front trailer 119 load.

Typically, a fifth wheel coupling 101 includes a support frame for mounting the coupling 101 to the towing vehicle 109, such as, for example, to a tractor truck. This support frame includes a pair of base rails that are usually bolted to the bed and/or frame of the truck and that are tied in parallel by tie bars. Side brackets are mounted to the base rails, either directly or through a pedestal which may be longitudinally adjustable. A fifth wheel 130 is mounted to the side brackets by means of a trunnion arrangement allowing for pivotal movement in the vertical plane. The fifth wheel 130 comprises a top bearing surface, or plate, and a slot opening toward the aft end of the towing vehicle for receiving a trailer kingpin, the slot bounded laterally by a pair of ramped tips. Fifth wheel 130 is an assembly which includes a jaw assembly, or locking mechanism that is specifically adapted to releasably engage and hold a kingpin 115 of a trailer desired to be towed by the towing vehicle 109. Often, base rails are mounted to angles which are then mounted to the truck frame.

Prior art fifth wheels are typically formed of steel or ductile iron and incorporates an integral load structure comprising a set of walls that serve to transfer the loads experienced by the bearing plate to the support and then to the tractor, and to house the kingpin locking mechanism. The load structure further comprises pivot bearings which rest upon the side brackets and permit pivotal movement of the bearing plate 130 in the vertical plane.

Heretofore, fifth wheels have been manufactured such that the bearing plate and load structure are integrated, either through casting to produce a unitary fifth wheel, or by welding the two components together. Thus, traditional fifth wheel mounting systems are designed such that the fifth wheel accounts for a majority of the stiffness and load carrying ability. The load path on traditionally mounted fifth wheels depends upon each of the mounting brackets being positioned directly over the truck frame rails. This minimizes the bending stress in the base rails and tie bars. As a result of this requirement, the width of traditional fifth wheels has been controlled by the width of the truck frames. Such fifth wheel assemblies of the prior art are bulky, requiring a significant amount of material to manufacture. They also add to the weight of the tractor.

SUMMARY

For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein.

A fifth wheel assembly according to an embodiment of the present invention comprises a fifth wheel having a plurality of journal bearings extending generally downward from its underside, and a transverse beam member for mounting the assembly to a truck frame. The beam member is dimensioned to span across parallel longitudinal truck frame members and it includes mounting flanges extending generally downward from either lateral side where the mounting flanges have a plurality of apertures for receiving suitable fasteners inserted therein for mounting said beam member to the truck frame members. The transverse member also includes a plurality of pivot bearing pairs to receive the journal bearings of the fifth wheel which is coupled thereto by a trunnion.

In one embodiment the transverse beam member has a generally planar portion. In another embodiment, the beam member is "I-shaped." In yet another embodiment, the beam member is "x-shaped."

All embodiments of the beam member include strengthening elements to add stiffness.

These and other embodiments of the present invention will also become readily apparent to those skilled in the art from the following detailed description of the embodiments having reference to the attached figures, the invention not being limited to any particular embodiment(s) disclosed.

BRIEF DESCRIPTION OF THE DRAWINGS

The present invention is described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION

The various embodiments of the present invention and their advantages are best understood by referring to FIGS. 1 through 7 of the drawings. The elements of the drawings are not necessarily to scale, emphasis instead being placed upon clearly illustrating the principles of the invention. Throughout the drawings, like numerals are used for like and corresponding parts of the various drawings.

The drawings represent and illustrate examples of the various embodiments of the invention, and not a limitation thereof. It will be apparent to those skilled in the art that various modifications and variations can be made in the present inventions without departing from the scope and spirit of the invention as described herein. For instance, features illustrated or described as part of one embodiment can be included in another embodiment to yield a still further embodiment. Moreover, variations in selection of materials and/or characteristics may be practiced to satisfy particular desired user criteria. Thus, it is intended that the present invention covers such modifications as come within the scope of the features and their equivalents.

Furthermore, reference in the specification to "an embodiment," "one embodiment," "various embodiments," or any variant thereof means that a particular feature or aspect of the invention described in conjunction with the particular embodiment is included in at least one embodiment of the present invention. Thus, the appearance of the phrases "in one embodiment," "in another embodiment," or variations thereof in various places throughout the specification are not necessarily all referring to its respective embodiment.

This invention may be provided in other specific forms and embodiments without departing from the essential characteristics as described herein. The embodiments described above are to be considered in all aspects as illustrative only and not restrictive in any manner. The appended claims rather than the foregoing description indicate the scope of the invention.

Figure 1A:
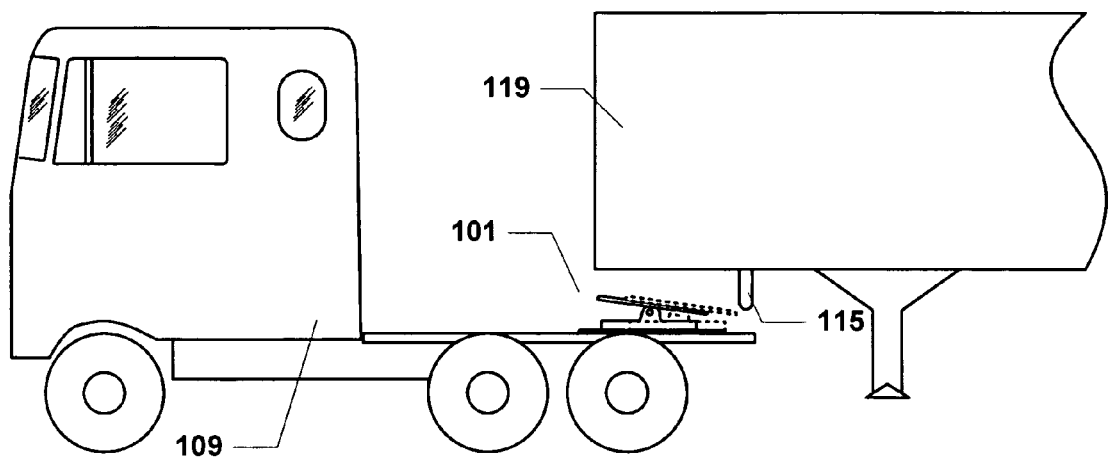
FIG. 1A is an illustration of an exemplary tractor and trailer showing the placement of a typical fifth wheel coupling.
Figure 1B:
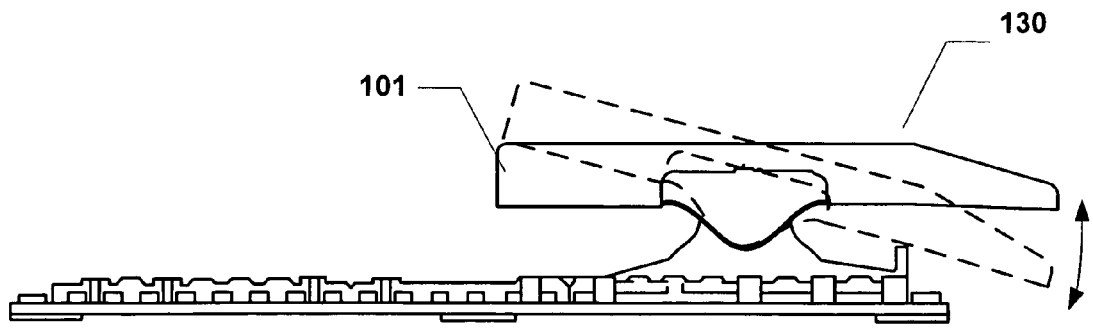
FIG. 1B is a side view of an exemplary fifth wheel coupling.
Figure 2:
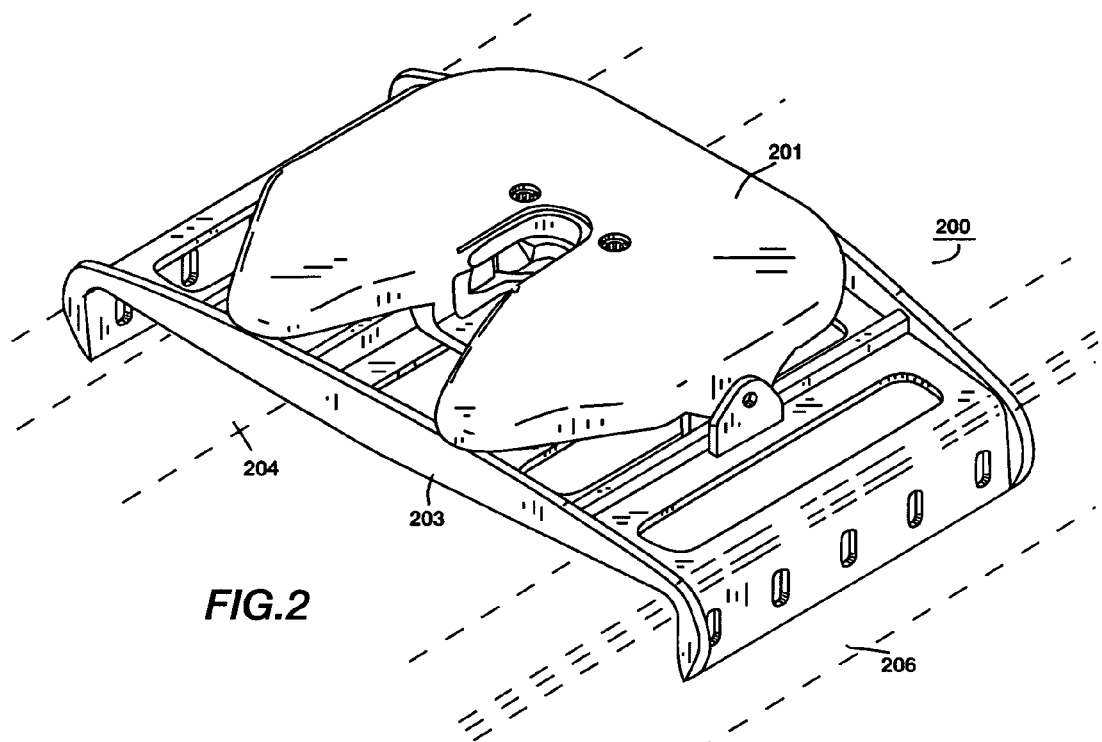
FIG. 2 is a perspective view of the fifth wheel assembly according to an embodiment of the present invention.

As used herein, terms of orientation such as "front," "rear," "lateral," "vertical," or "transverse," or the like, are to be construed with respect to a truck upon which the fifth wheel assembly is mounted. FIG. 2 depicts an exemplary fifth wheel assembly 200 according to an embodiment of the present invention. The fifth wheel 201 is shown mounted to a transverse beam member 203 which is mounted directly to parallel, longitudinal truck frame members 204, 206 shown in dashed lines.

Figure 3:
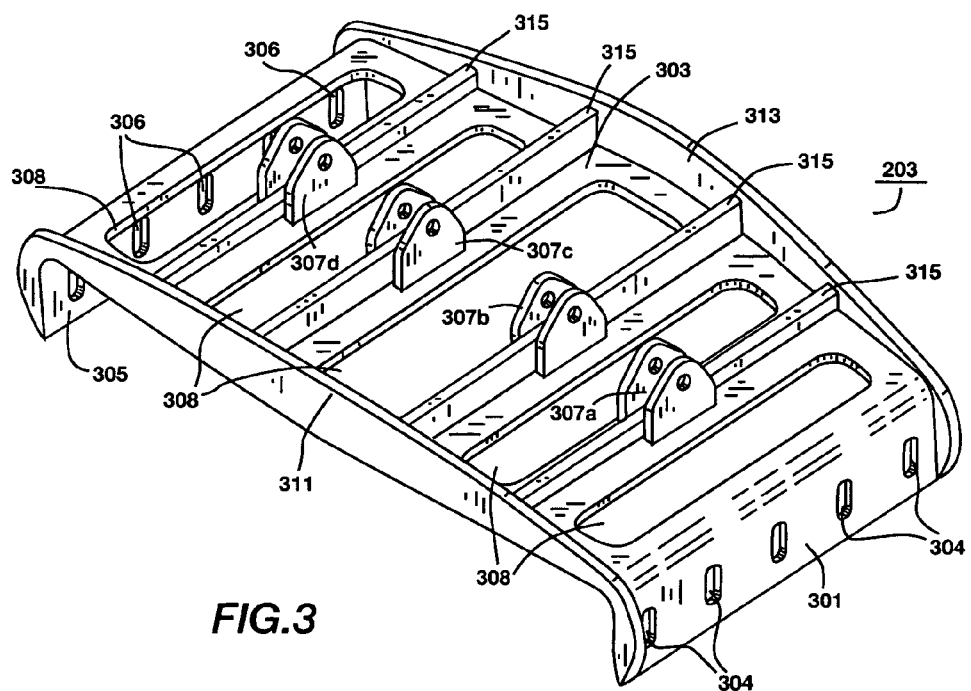
FIG. 3 is a perspective view of a transverse beam member according to an embodiment of the present invention.

In the embodiment shown in greater detail in FIG. 3, exemplary transverse beam member 203 comprises a generally planar portion 303 which is dimensioned to span the truck frame members 204, 206. Extending generally downward from the planar portion 303 are mounting flanges 301, 305. Mounting flanges 301, 305 include a plurality of apertures 304, 306 for receiving suitable fasteners inserted therein for mounting the beam member 203 to the truck frame members 204, 206. Preferably, apertures 304, 306 are oblong in shape to allow for some movement of the beam member 203 in operation.

Beam member 203 includes a plurality of pivot bearing pairs 307a-d extending upward from planar portion 303. Pivot bearing pairs 307a-d are disposed generally in a line and include mutually corresponding apertures. This configuration allows for mounting of the fifth wheel 201 such that the fifth wheel is able to pivot in the vertical plane as discussed in greater detail below.

Preferably, beam member 203 incorporates strengthening walls 311, 313 extending from fore and rear periphery of planar portion 303 for additional rigidity along the transverse axis. The walls 311, 313 may also wrap around to extend outward from the fore and rear periphery of the mounting flanges 301, 305 as shown in the Figure. Walls 311, 313 may be formed having a highest point midway between either outward edge and then tapering as the walls extend laterally.

For rigidity in the longitudinal axis, beam member 203 preferably includes a plurality of longitudinally disposed ridges 315 that extend from the forward wall 311 the rearward wall 313. Pivot bearing pairs 307a-d may be configured to extend from planar portion 303 on either side of the ridges 315. Advantageously, the planar portion 303 may include a number of apertures 308 which reduces the amount of material required to form the beam member 203 and transfers load to the longitudinal ridges 315 and walls 311, 313.

Figure 4:
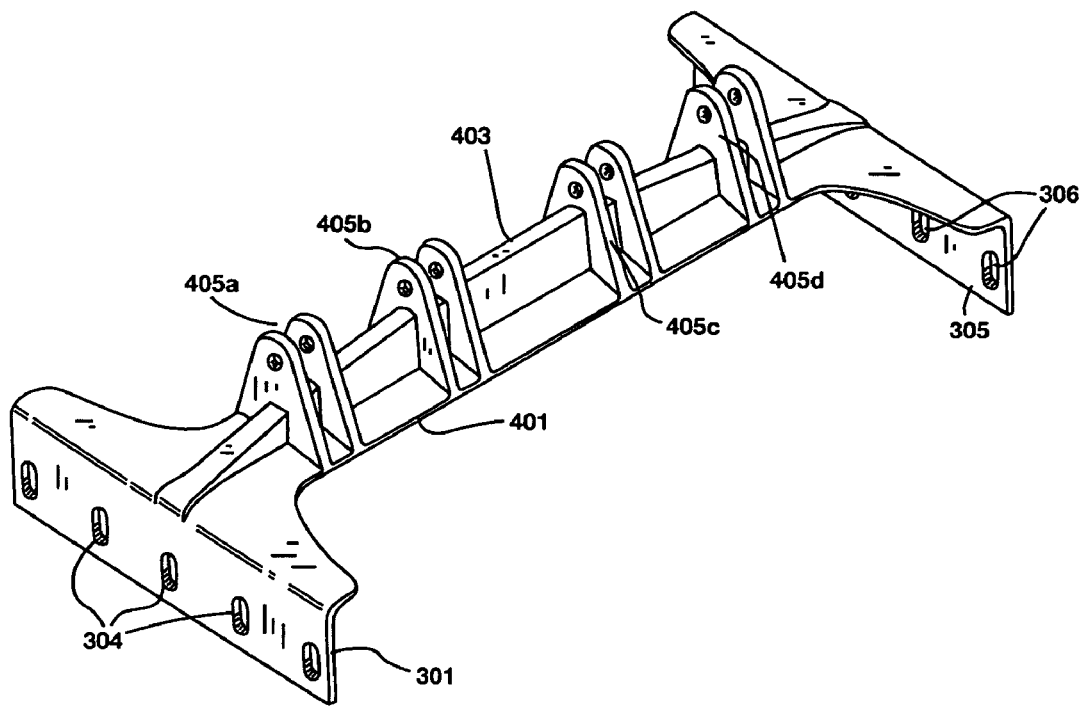
FIG. 4 is a perspective view of an transverse beam member according to another embodiment of the present invention.

FIG. 4 depicts a further embodiment of the present invention where beam member is an "I-shaped" member 401 dimensioned to span truck frame members and which may preferably include a transversely oriented ridge 403 extending generally upward. In this example, pivot bearing pairs 405a-d are positioned along transverse ridge 403. Similar to the walls in the previous example, ridge 403 may also have its highest extension at the lateral midway point and taper as the ridge extends laterally. Mounting flanges 301, 305, again, extend downward from the lateral ends of the i-shape and include mounting apertures 304, 306.

Figure 5:
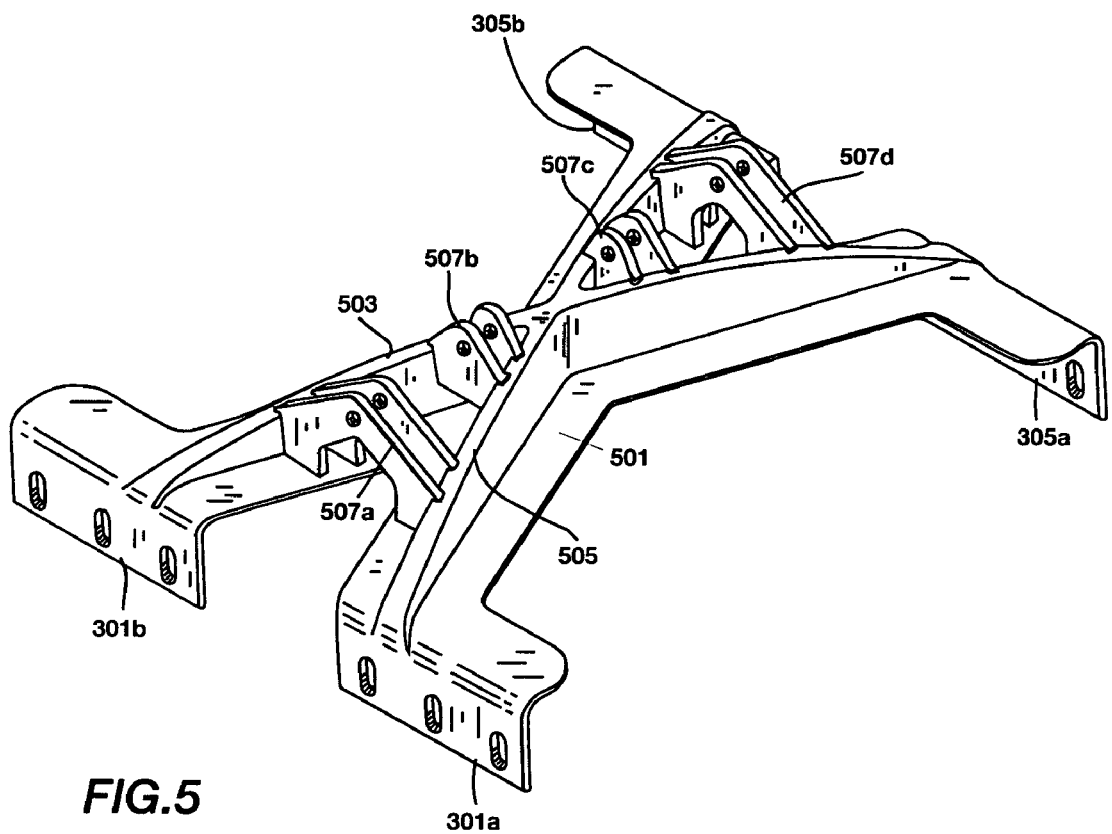
FIG. 5 is a perspective view of an transverse beam member according to another embodiment of the present invention.

Yet a further embodiment is shown in FIG. 5. In this case, beam member is "X-shape" 501 dimensioned to span truck frame members and which may include ridges 503, 505 that are likewise disposed in an x-shape an extend upward from the beam member 501. Pivot bearing pairs 507a-d are distributed evenly within the lateral angles of the "x" formed by the ridges 503, 505. Again, preferably, the ridges 503, 505 have their greatest heights in the middle and taper as they extend to the lateral ends. Mounting flanges 301a, b and 305a, b may be divided such that a separate flange extends from each lateral end of the beam member.

Figure 6:
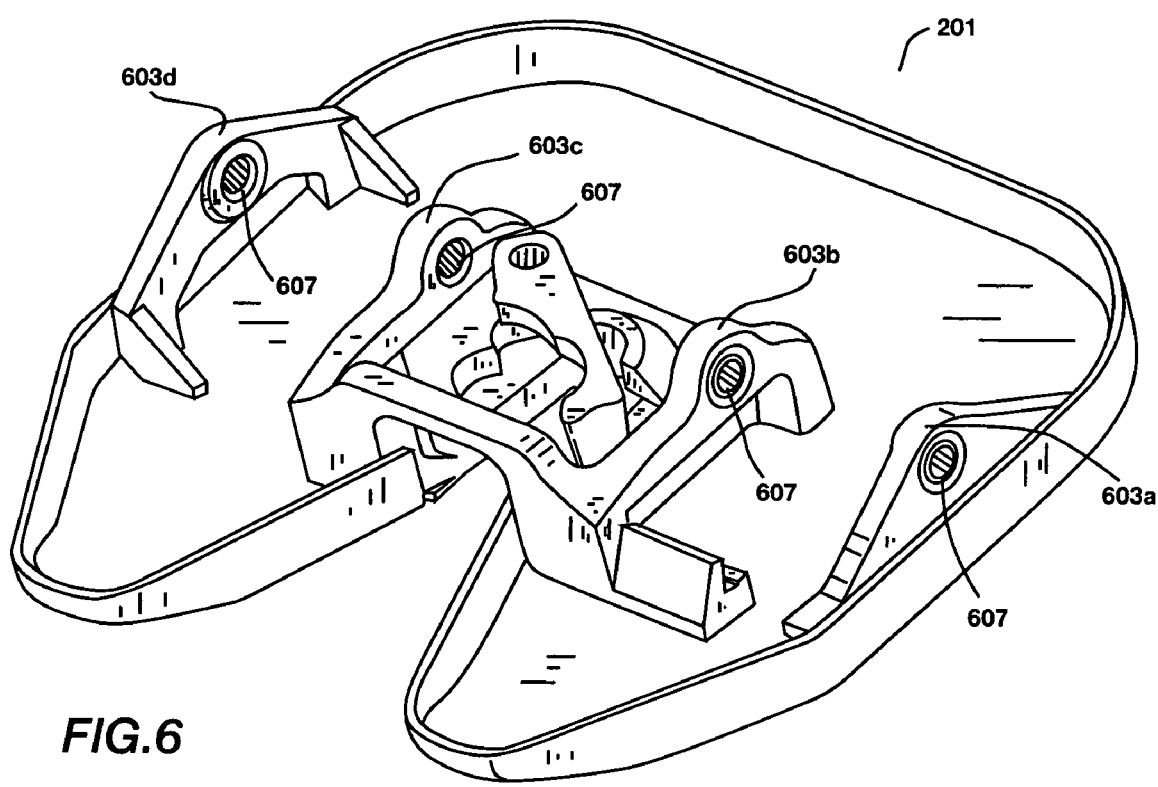
FIG. 6 is a perspective view of the underside of a fifth wheel according to an embodiment of the present invention.

Referring to FIG. 6, a fifth wheel 201 for use in the assembly according to an embodiment of the present invention includes a plurality journal bearings 603a-d, the number of which correspond to the number of pivot bearing pairs on the beam member 203. Each journal bearing 603a-d includes apertures 607 for receiving a trunnion, or mounting pin, described in greater detail below.

Figure 7:
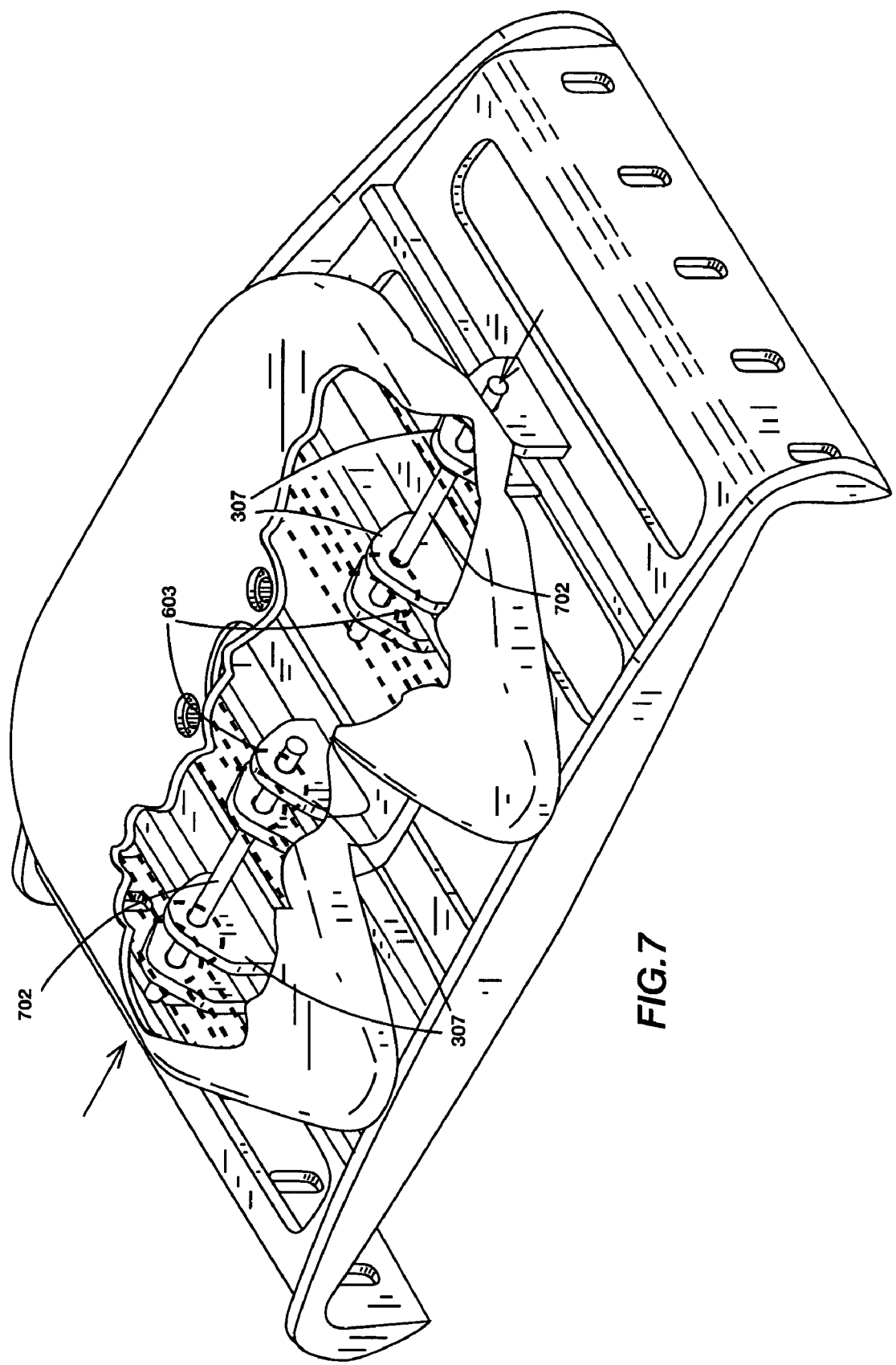
FIG. 7 is a perspective view of the assembly illustrating the mounting of fifth wheel to the beam member according to an embodiment of the present invention.

Assembly of the present invention is illustrated in FIG. 7 wherein journal bearings 603, shown in dashed lines, are received in between each pivot bearing pair 307. Apertures of journal bearings align with the mutually corresponding apertures of the pivot bearings and a trunnion 702a, b is inserted through each outer pivot bearing and through the apertures of the innermost pivot bearing/journal bearing combination. This allows the fifth wheel to rotate vertically about the trunnions.

Advantageously, a fifth wheel according to the present invention eliminates the requirement for mounting brackets to be positioned directly over the truck frame members as in the prior art. This allows fifth wheels of any desired width to be accommodated. Further, since the beam member carries a majority of the load exerted by a trailer, fifth wheels of lighter weight can be used because of a reduced need for internal load bearing structures. Multiple attachment points, the journal bearings, may be spaced across the beam member so that the strength and stiffness of the assembly is maximized.

Because the beam member is directly mounted to the truck frame, there is no need for mounting angles. It will be appreciated by those skilled in the art that the beam member following the principles of the above-described design could replace existing truck frame cross bracing, thereby reducing truck gross weight even more. It will also be appreciated that the foregoing structures, or the like, may be formed using a variety of suitable materials similar to fifth wheel assemblies of the prior art, and in any manner known in the art, or hereafter developed, including welding constituent components and casting.

As described above and shown in the associated drawings, the present invention comprises a fifth wheel assembly with removable bearing plate. While particular embodiments of the invention have been described, it will be understood, however, that the invention is not limited thereto, since modifications may be made by those skilled in the art, particularly in light of the foregoing teachings. It is, therefore, contemplated by the following claims to cover any such modifications that incorporate those features or those improvements that embody the spirit and scope of the present invention.

What is claimed is:

1. A fifth wheel assembly comprising:
   a. a fifth wheel having a plurality of journal bearings extending generally downward from an underside thereof; and
   b. a generally planar transverse beam member for mounting said assembly to a truck frame, said beam member dimensioned to span across longitudinal truck frame members and having walls extending generally outward from the forward and rearward periphery thereof and mounting flanges extending generally downward from either lateral periphery thereof, said mounting flanges including a plurality of apertures for receiving fasteners inserted therein for mounting said beam member to the truck frame members, and a plurality of pivot bearing pairs to receive said journal bearings coupled thereto by a trunnion, said pivot bearing pairs extending generally upward from said beam member.

2. The fifth wheel assembly of claim 1, wherein said pivot bearing pairs bracket longitudinal ridges disposed between said walls and wherein said generally planar member further comprises an aperture disposed between each said longitudinal ridge.

3. The fifth wheel assembly of claim 2, wherein said generally planar member comprises an aperture in either lateral portion thereof.

4. A fifth wheel mounting beam for pivotally mounting a fifth wheel comprising:
   a. A generally planar transverse beam member dimensioned to span parallel longitudinal truck frame members;
   b. lateral mounting flanges extending generally downward from either lateral periphery of said beam member, said mounting flanges including a plurality of apertures for receiving fasteners inserted therein for mounting said beam member to the truck frame members;
   c. walls extending from forward and rearward periphery of said beam member; and
   d. a plurality of pivot bearing pairs to receive a corresponding plurality of journal bearings coupled thereto by a corresponding plurality of trunnions, said pivot bearing pairs extending generally upward from said beam member.

5. The fifth wheel mounting beam of claim 4, wherein said pivot bearing pairs bracket longitudinal ridges disposed between said walls and wherein said generally planar member further comprises an aperture disposed between each said longitudinal ridge.

6. The fifth wheel mounting beam of claim 5, wherein said generally planar member comprises an aperture in either lateral portion thereof.

* * * * *